(12) United States Patent
Chang et al.

(10) Patent No.: US 7,601,785 B2
(45) Date of Patent: Oct. 13, 2009

(54) SULPHONATED MULTIBLOCK COPOLYMER AND ELECTROLYTE MEMBRANE USING THE SAME

(75) Inventors: Jae Hyuk Chang, Daejeon (KR); Young Ji Tae, Seoul (KR); Chong Kyu Shin, Daejeon (KR); Bong Keun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 776 days.

(21) Appl. No.: 11/301,243

(22) Filed: Dec. 13, 2005

(65) Prior Publication Data

US 2006/0160960 A1   Jul. 20, 2006

(30) Foreign Application Priority Data

Dec. 14, 2004   (KR) ................ 10-2004-0105493

(51) Int. Cl.
*C08G 59/62* (2006.01)
(52) U.S. Cl. ............. 525/471; 521/25; 521/27; 525/514; 525/521; 525/534; 525/535
(58) Field of Classification Search .......... 525/471, 525/514, 521, 534, 535; 521/25, 27
See application file for complete search history.

(56) References Cited

U.S. PATENT DOCUMENTS

| 4,625,000 | A | 11/1986 | Chao et al. |
| 6,586,561 | B1 | 7/2003 | Litt et al. |
| 7,258,941 | B2 * | 8/2007 | Hirano et al. ............. 429/33 |

| 2003/0044669 | A1 | 3/2003 | Hidaka et al. |
| 2004/0101730 | A1 * | 5/2004 | Hirano et al. ............. 429/33 |

FOREIGN PATENT DOCUMENTS

| EP | 1 113 517 A2 | 7/2001 |
| JP | 2003-147074 | 5/2003 |
| KR | 10-2002-0066264 A | 8/2002 |
| KR | 10-2002-0076825 A | 10/2002 |
| KR | 10-2003-0004097 A | 1/2003 |
| KR | 10-2006-0019492 A | 3/2006 |

OTHER PUBLICATIONS

Miyatake, Kenji, et al., *Novel Sulfonated Poly(arylene ether): A Proton Conductive Polymer Electrolyte Designed for Fuel Cells*, American Chemical Society, 2003, pp. 9691-9693.

* cited by examiner

*Primary Examiner*—Bernard Lipman
(74) *Attorney, Agent, or Firm*—McKenna Long & Aldridge, LLP (57) ABSTRACT

Disclosed is a sulfonated multiblock copolymer, which comprises a hydrophilic block (X) having a repeating unit represented by the following formula 1a, and a hydrophobic block (Y) having a repeating unit represented by the following formula 2, wherein the number (m) of the repeating unit of formula 1a in the hydrophilic block (X) and the number (n) of the repeating unit of formula 2 in the hydrophobic block (Y) satisfy the conditions of $4 \leq m \leq 400$ and $4 \geq n \geq 400$. An electrolyte membrane obtained from the sulfonated multiblock copolymer and a fuel cell using the electrolyte membrane are also disclosed:

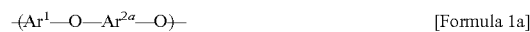

[Formula 1a]

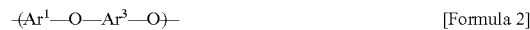

[Formula 2]

19 Claims, 3 Drawing Sheets

FIG. 1

Hydrophilic(▬)-Hydrophobic(∼)

SULPHONATED MULTIBLOCK COPOLYMER AND ELECTROLYTE MEMBRANE USING THE SAME

This application claims the benefit of Korean Patent Application No. 10-2004-105493, filed on Dec. 14, 2004 in Korea Industrial Property Office, which is hereby incorporated by reference in its entirety for all purposes as if fully set forth herein.

TECHNICAL FIELD

The present invention relates to a sulfonated multiblock copolymer, an electrolyte membrane prepared from the sulfonated multiblock copolymer, and a fuel cell using the electrolyte membrane.

BACKGROUND ART

Fuel cells are energy conversion systems that convert chemical energies of fuels directly into electric energies. Fuel cells have high energy efficiency, and are environmentally friendly in that they are substantially free from emission of pollutants. Therefore, fuel cells have become the focus of attention as alternative energy technology. Among such fuel cells, polymer electrolyte membrane fuel cells (PEMFCs) are particularly advantageous, because they have a low drive temperature, are free from leakage problems caused by the use of a solid electrolyte, and allow high-speed operation. Thus, PEMFCs are spotlighted as portable, automotive and household power sources.

As a polymer electrolyte membrane, Nafion, a perfluorinated polymer membrane developed by the Dupont Inc. has been widely used. The polymer membrane (Nafion) has a polytetrafluoroethylene (PTFE) backbone, and shows excellent quality, including mechanical properties and chemical stability, in the field of fuel cells. However, Nafion is problematic in that it is expensive due to its complicated manufacturing process, causes degradation in the quality of a direct methanol fuel cell (DMFC) due to a so-called methanol crossover phenomenon, and shows decreased conductivity at high temperature. Therefore, novel polymer membranes have been developed to substitute for Nafion.

The polymer electrolyte membrane used in a fuel cell should be stable under the conditions required for driving the fuel cell. Thus, the polymer that may be used in the electrolyte membrane is extremely limited to aromatic polyether (APE), or the like. When a fuel cell drives, the polymer membrane is decomposed due to hydrolysis, oxidation and reduction, resulting in degradation in the quality of the fuel cell. Therefore, polyarylene ether polymers, including polyetherketone and polyethersulfone, have been researched and developed for their application for a fuel cell, due to their excellent chemical stability and mechanical properties.

U.S. Pat. No. 4,625,000 discloses a process of post-sulfonation for polyethersulfone as a polymer electrolyte membrane. In the post-sulfonation process, a strong acid such as sulfuric acid is used as a sulfonating agent and sulfonic acid groups (—$SO_3H$) are introduced randomly into the polymer backbone. Hence, it is difficult to control the distribution, position and number of the sulfonic acid groups.

Additionally, EP 1,113,517A2 discloses a polymer electrolyte membrane, which comprises a block copolymer having a sulfonic acid group-containing block and a sulfonic acid group-free block. The block copolymer comprising an aliphatic block and an aromatic block is subjected to post-sulfonation by using sulfuric acid. Therefore, there is a problem of decomposition of chemical bonds of the aliphatic polymer during the sulfonation. Moreover, because the sulfonic acid groups are randomly introduced into the ring that forms the aromatic block, it is difficult to control the position and number of sulfonic acid groups in the polymer backbone.

Meanwhile, an article written by Prof. Watanabe [Macromolecules 2003, 36, 9691-9693] and Japanese Laid-Open Patent No. 2003-147074 disclose a process for introducing sulfonic acid groups into the fluorene present in a fluorene compound-containing copolymer by using chlorosulfonic acid ($ClSO_3H$) or sulfuric acid. In the above method, sulfonic acid groups are randomly introduced into the ring that forms the fluorene compound.

The aforementioned sulfonation processes for a polymer according to the prior art could not satisfy the physical properties of an electrolyte membrane, required for driving a fuel cell. More particularly, when the content of sulfonic acid groups (degree of sulfonation; DS) is increased, i.e. when the ion exchange capacity (IEC) of an electrolyte membrane is increased to 1.3 meq/g or more, in order to realize a proton conductivity similar to the proton conductivity of commercially available Nafion, water content and methanol content of the electrolyte membrane increase excessively, resulting in a significant drop in mechanical integrity of the electrolyte membrane (for example, dissolution of the electrolyte membrane into methanol).

DISCLOSURE OF THE INVENTION

Therefore, the present invention has been made in view of the aforementioned problems. The present inventors have studied intensively in order to inhibit a drop in mechanical integrity of a polymer electrolyte membrane, caused by dissolution of the polymer into water or alcohols, such as methanol, due to hydrophilic sulfonic acid groups distributed broadly and randomly in the polymer. It is an object of the present invention to provide a sulfonated multiblock copolymer comprising a hydrophilic block (X) having closely arranged hydrophilic sulfonic acid groups, as a region showing proton conductivity, and a hydrophobic block (Y) capable of imparting mechanical strength, wherein the hydrophilic block (X) and the hydrophobic block (Y) are present alternately, and the molecular weight and proportion of the hydrophilic block (X) and the hydrophobic block (Y) are controlled. It is another object of the present invention to provide an electrolyte membrane prepared from the above copolymer. It is still another object of the present invention to provide a fuel cell using the above electrolyte membrane.

According to an aspect of the present invention, there is provided a sulfonated multiblock copolymer, which comprises a hydrophilic block (X) having a repeating unit represented by the following formula 1a, and a hydrophobic block (Y) having a repeating unit represented by the following formula 2, wherein the number (m) of the repeating unit of formula 1a in the hydrophilic block (X) and the number (n) of the repeating unit of formula 2 in the hydrophobic block (Y) satisfy the conditions of $4 \leq m \leq 400$ and $4 \leq n \leq 400$. There is also provided a method for preparing the sulfonated multiblock copolymer.

[Formula 1a]

[Formula 2]

wherein $Ar^1$ is a bonding unit represented by the following formula 3; $Ar^{2a}$ is a bonding unit represented by the following formula 4a; and $Ar^3$ is a bonding unit represented by the following formula 5.

[Formula 3]

wherein A is a direct bond, —O—, —S—, —CO—, —SO$_2$—, —C(CH$_3$)$_2$—, or —C(CF$_3$)$_2$—; and each of R$^1$ to R$^8$ independently represents a hydrogen atom, C1~C6 alkyl group, C2~C6 alkenyl group, C2~C6 alkynyl group, nitro group, chlorine, bromine, oxo or a hydroxy group.

[Formula 4a]

wherein each of x and x' independently represents a number satisfying the conditions of 0≦x≦1 and 0≦x'≦1, with the proviso that 0<x+x'≦2; and each of R$^9$ to R$^{22}$ independently represents a hydrogen atom, C1~C6 alkyl group, C2~C6 alkenyl group, C2~C6 alkynyl group, nitro group, chlorine, bromine, oxo or a hydroxy group.

[Formula 5]

wherein B is a direct bond, —O—, —S—, —CO—, —SO$_2$—, —C(CH$_3$)$_2$—, or —C(CF$_3$)$_2$—; and each of R$^{23}$ to R$^{30}$ independently represents a hydrogen atom, C1~C6 alkyl group, C2~C6 alkenyl group, C2~C6 alkynyl group, nitro group, chlorine, bromine, oxo or a hydroxy group.

According to another aspect of the present invention, there is provided an electrolyte membrane prepared from the sulfonated multiblock copolymer. According to still another aspect of the present invention, there is provided a fuel cell using the above electrolyte membrane.

Hereinafter, the present invention will be explained in more detail.

As used herein, "block" means a polymer including at least two repeating units linked to each other, wherein the repeating units are the same. The term "multiblock copolymer" refers to a copolymer including at least two types of different blocks linked to each other via a direct bond or via a linking group, wherein one or more blocks are present per each block type.

Sulfonic acid groups are introduced into a polymer electrolyte membrane in order to impart proton (H$^+$) conductivity. However, because sulfonic acid groups are hydrophilic, excessive introduction of sulfonic acid groups into a polymer electrolyte membrane results in weakening of the water resistance of the polymer electrolyte membrane. Additionally, in this case, the polymer electrolyte is swelled due to the increased water content, and thus shows degradation in the mechanical strength and integrity. Hence, the polymer electrolyte cannot satisfy the physical properties required for driving a fuel cell.

Therefore, the present invention provides a sulfonated multiblock copolymer in order to inhibit degradation in the integrity of a polymer electrolyte membrane, caused by the dissolution of the polymer into water or alcohols such as methanol due to hydrophilic sulfonic acid groups, randomly and broadly distributed in the polymer. The sulfonated multiblock copolymer according to the present invention is characterized by comprising a hydrophilic block (X) having closely arranged hydrophilic sulfonic acid groups, as a region showing proton conductivity, and a hydrophobic block (Y) capable of imparting mechanical strength, wherein the molecular weight and proportion of the hydrophilic block (X) and the hydrophobic block (Y) are controlled.

The hydrophilic block (X), into which sulfonic acid groups are introduced, means a block having 0.5 or more sulfonic acid groups, on average, per repeating unit.

Block copolymers have self-assembly characteristics. Thus, a polymer composed of interatomic covalent bonds spontaneously forms a specific nano-structure due to the intermolecular attraction force, thereby providing a two-dimensional pattern. When the multiblock copolymer according to the present invention is processed into an electrolyte membrane, it forms a substrate for an electrolyte membrane that imparts the mechanical strength and integrity as a separator, by virtue of the hydrophobic block (Y) having repeating units represented by the above formula 2. Also, the hydrophilic block (X) having repeating units represented by the above formula 1a protrudes out of the substrate in the form of a cylinder, so as to form an ion conductive channel. By doing so, it is possible to form a two-dimensional pattern (see FIG. 1).

Figure 1:
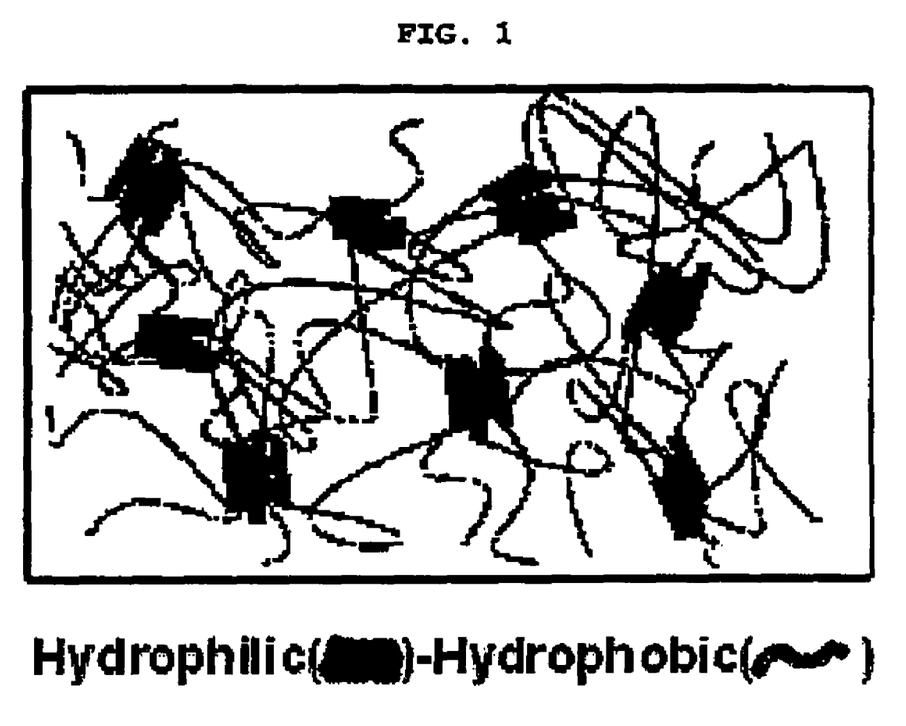
FIG. 1 is a diagram showing the two-dimensional pattern of the sulfonated multiblock copolymer according to the present invention.

The hydrophilic block (X), which forms a plurality of cylindrical bodies protruding out of the electrolyte membrane that has the two-dimensional pattern as described above, includes closely arranged conductive sulfonic acid groups showing ion conductivity, so as to permit the multiblock copolymer to serve as an electrolyte membrane having ion conductivity. In order to inhibit degradation in the mechanical strength of the multiblock copolymer, caused by dissolution of the multiblock copolymer into a polar solvent such as water, methanol, ethanol, etc., due to the hydrophilicity of the sulfonic acid groups that are closely arranged in the hydrophilic block (X), the hydrophobic block (Y) adjacent to the hydrophilic block (X) should be free from hydrophilic groups such as sulfonic acid groups. Additionally, the hydrophobic block (Y) should be controlled to have a molecular weight of 2,000 (g/mol)~200,000 (g/mol). By doing so, it is possible to impart mechanical strength to the whole block copolymer. More preferably, the hydrophobic block (Y) has a molecular weight of about 6,000. In general, the minimum mechanical strength of a polymer electrolyte membrane, required for driving a fuel cell, is defined as an elongation of 50% and a tensile strength of about 20 Mpa.

To impart adequate mechanical integrity by the hydrophobic block (Y) while providing adequate ion conductivity by the hydrophilic block (X), the multiblock copolymer according to the present invention should be controlled in such a manner that the number (m) of the repeating units represented by formula 1a in the hydrophilic block (X), and the number (n) of the repeating units represented by formula 2 in the hydrophobic block (Y) satisfy the conditions of 4≦m≦400 and 4≦n≦400, respectively. Additionally, it is preferable that the hydrophilic block (X) has a molecular weight corresponding to 0.2~4 times of the molecular weight of the hydrophobic block (Y), so as to provide proton conductivity balanced with mechanical properties.

Preferably, the multiblock copolymer according to the present invention has a molecular weight of 4,000 (g/mol)~400,000 (g/mol). If the block copolymer has a molecular weight of less than 4,000 (g/mol), the electrolyte membrane comprising the multiblock copolymer cannot provide sufficient strength. On the other hand, if the block copolymer has a molecular weight of greater than 400,000 (g/mol), it is difficult to process the block copolymer into an electrolyte membrane.

Meanwhile, aromatic rings not forming the backbone like a side chain show higher activity to sulfonation compared to aromatic rings forming the backbone. Therefore, the multiblock copolymer according to the present invention is characterized by comprising, as a bonding unit in the repeating units of the hydrophilic block (X), a unit (e.g. fluorene group-containing unit) having an aromatic ring that does not form the backbone like a side chain, in order to form the hydrophilic block (X) including closely arranged sulfonic acid groups during the sulfonation, which is an electrophilic nuclear substitution reaction. Also, the multiblock copolymer according to the present invention is characterized by using an aromatic unit instead of an aliphatic unit, as a bonding unit in the repeating units of the hydrophilic block (X) as well as the hydrophobic block (Y), so as to prevent the backbone from breaking during sulfonation.

According to the present invention, a fluorene group-containing bonding unit represented by formula 4a, which has high reactivity to sulfonation, is used as the $Ar^{2a}$ in the repeating units represented by formula 1a. Additionally, the hydrophilic block (X) having the fluorene group-containing bonding unit represented by formula 4a and the hydrophobic block not containing the fluorene group-containing bonding unit are controlled in terms of their molecular weights, so that distribution, position and number of the sulfonic acid groups in the polymer can be controlled. As a result of this, it is possible to impart mechanical integrity so as to prevent the block copolymer from being dissolved in a polar solvent such as water, methanol or ethanol.

Meanwhile, a random copolymer comprising repeating units represented by formula 1a and repeating units represented by formula 2 has sulfonic acid groups introduced randomly into the ring that forms a fluorene compound. Moreover, when the degree of sulfonation of the copolymer is increased in order to realize proton conductivity similar to proton conductivity of the commercially available Nafion, i.e. when ion exchange capacity of an electrolyte membrane is increased to 1.3 (meq/g) or more, water content and methanol content of the electrolyte membrane increases excessively, resulting in significant degradation in the mechanical integrity of the electrolyte membrane, for example, caused by dissolution of the electrolyte membrane in methanol. Therefore, it is not possible for the electrolyte membrane to satisfy the physical properties required for driving a fuel cell.

On the other hand, the multiblock copolymer according to the present invention is provided in the form of a copolymer comprising a fluorene-containing block (X') and a fluorene-free block (Y), separately from each other. Then, sulfonic acid groups are introduced selectively into the fluorene-containing block (X') by using a sulfonating agent such as chlorosulfonic acid ($ClSO_3H$) or trimethylsilylchloro sulfonate [$(CH_3)_3SiSO_3Cl$], so that the hydrophilic block (X) having fluorene groups, into which sulfonic acid groups are introduced, form an ion cluster, i.e. an ion conductive channel to impart proton conductivity to the resultant electrolyte membrane. Herein, the block (Y) free from fluorene groups, and thus having no sulfonic acid groups, forms the hydrophobic block that imparts mechanical integrity. Therefore, it is possible to obtain a multiblock copolymer electrolyte membrane having optimized proton conductivity and mechanical integrity.

In case of the sulfonated multiblock copolymer, which has fluorene compounds present only in specific blocks (X and X') and includes the hydrophobic block (Y) capable of imparting optimized mechanical integrity according to the present invention, as described above, an excessive amount of sulfonic acid groups may be introduced selectively into the fluorene compound-containing block (X') in order to realize proton conductivity similar to or higher than the proton conductivity of the commercially available Nafion. In this case, the multiblock copolymer may have a high degree of sulfonation and a relatively high ion exchange capacity of 1.3 meq/g or more. However, under these circumstances, the hydrophobic block (Y) free from fluorene compounds permits an electrolyte membrane to maintain mechanical integrity. Hence, it is possible to provide an electrolyte membrane that satisfies the physical properties required for driving a fuel cell.

In the repeating units represented by formulae 1 and 2, $Ar^1$ is used in order to impart reactivity to polymerization with $Ar^{2a}$, and $Ar^3$ in the repeating unit represented by formula 2 is used to impart solubility to organic solvents while maintaining the mechanical integrity of the block copolymer.

Particular examples of the precursor of $Ar^1$ include 4,4'-difluorobenzophenone, 4,4'-dichlorodiphenylsulfone, 4,4'-difluorodiphenylsulfone, bis(4-fluorophenyl) sulfone, or the like.

Particular examples of the precursor of $Ar^{2a}$ include 9,9-bis(4-hydroxyphenylfluorene), or the like, and the precursor may be sulfonated after it is introduced into the block copolymer.

Particular examples of the precursor of $Ar^3$ include 2,2-bis(4-hydroxyphenyl)hexafluoropropane, 4,4'-biphenol, bis(4-hydroxyphenyl)sulfone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)methane, 2,2-bis(4-hydroxy-3,5-dimethylphenyl)propane, bis(4-hydroxy-3,5-dimethylphenyl)methane, bis(4-hydroxy-2,5-dimethylphenyl)methane, or the like.

As long as the hydrophilic block (X) and hydrophobic block (Y) are represented by formulae 1a and 2, respectively, at least one kind of hydrophilic block (X) and at least one kind of hydrophobic block (Y) may be present in a single multiblock copolymer.

Additionally, each of the bonding units $Ar^1$, $Ar^{2a}$ and $Ar^3$ may have any structures as long as they are represented by formulae 3, 4a and 5, respectively. The bonding unit $Ar^1$ present in the sulfonated multiblock copolymer according to the present invention is not limited to any one structure, but $Ar^1$ bonding units having at least two different structures may be present at the same block or different blocks in the same block copolymer. Bonding units $Ar^{2a}$ and $Ar^3$ are applied in the same manner as described above.

The sulfonated multiblock copolymer according to the present invention may further comprise another unit in addition to the repeating units forming the hydrophilic block (X) and hydrophobic block (Y). For example, the sulfonated multiblock copolymer may further comprise an alkylene ether unit such as ethylene oxide, propylene oxide or tetramethylene oxide; perfluoroalkylene ether unit; an aromatic ether unit having an aromatic imide, amide, oxazole or thiazole bond; an aromatic ether unit containing a heterocyclic ring such as thiophene or pyrrole; an aromatic sulfide unit; or the like. Each of the above unit may be present in the multiblock copolymer according to the present invention in itself or in the form of a block.

Typically, the sulfonated multiblock copolymer according to the present invention may be prepared by the following method. However, the following method is an example of the methods for preparing the sulfonated multiblock copolymer according to the present invention, and thus the following method does not limit the scope of the present invention.

A preferred embodiment of the method for preparing the sulfonated multiblock copolymer according to the present invention comprises the steps of:

(a) providing a block copolymer comprising a block (X') having a repeating unit represented by the following formula 1b and a block (Y) having a repeating unit represented by the following formula 2; and

(b) subjecting the block copolymer obtained from step (a) to sulfonation:

[Formula 1b]

[Formula 2]

wherein $Ar^1$ is a bonding unit represented by the above formula 3; $Ar^{2b}$ is a bonding unit represented by the following formula 4b; and $Ar^3$ is a bonding unit represented by the above formula 5.

[Formula 4b]

wherein each of $R^9$ to $R^{22}$ independently represents a hydrogen atom, C1~C6 alkyl group, C2~C6 alkenyl group, C2~C6 alkynyl group, nitro group, chlorine, bromine, oxo or a hydroxy group.

When the block copolymer comprising a block (X') having a repeating unit represented by formula 1b and a block (Y) having a repeating unit represented by formula 2 is subjected to sulfonation, sulfonic acid groups are introduced selectively into the fluorine compounds in the block (X').

In the above method, the block copolymer comprising the block (X') and the block (Y) may be provided by any one process selected from a first process including the following steps (i) and (ii), and a second process including the following steps (i') and (ii'):

(i) copolymerizing at least one precursor selected from the group consisting of the aforementioned precursors for providing the bonding unit represented by formula 3 with at least one precursor selected from the group consisting of the aforementioned precursors for providing the bonding unit represented by formula 4b to provide at least one precursor for providing the block (X') having the repeating unit represented by formula 1b;

(ii) copolymerizing at least one precursor for providing the block (X') with at least one precursor selected from the group consisting of the aforementioned precursors for providing the bonding unit represented by formula 3, and at least one precursor selected from the group consisting of the aforementioned precursors for providing the bonding unit represented by formula 5;

(i') copolymerizing at least one precursor selected from the group consisting of the aforementioned precursors for providing the bonding unit represented by formula 3 with at least one precursor selected from the group consisting of the aforementioned precursors for providing the bonding unit represented by formula 5 to provide at least one precursor for providing the block (Y) having the repeating unit represented by formula 2; and (ii') copolymerizing at least one precursor for providing the block (Y) with at least one precursor selected from the group consisting of the aforementioned precursors for providing the bonding unit represented by formula 3 and at least one precursor selected from the group consisting of the aforementioned precursors for providing the bonding unit represented by formula 4b.

When preparing the multiblock copolymer comprising the block (X') and the block (Y), anhydrous carbonates may be used as a catalyst. Herein, conventional anhydrous carbonates may be used, but potassium carbonate ($K_2CO_3$) is preferable.

In the above method, a mixture of the above precursors are stirred at 140~150° C. for 3~5 hours, and then an azeotropic mixture of toluene, benzene or chlorobenzene with water may be removed through a dean-stark trap. Preferably, such removal step is carried out until the distilled azeotropic mixture is not detected from the dean-stark trap. After the completion of the removal of the azeotropic mixture, the reaction mixture is allowed to react at 170~190° C. for 6~24 hours with continuous stirring. After the completion of the reaction, the resultant reaction product is added directly to deionized water or methanol, or is diluted with deionized water or methanol added thereto, and then filtered to remove the salt present in the reaction product. Next, the filtrate containing the reaction product is precipitated in deionized water. Then, the precipitate is filtered, and washed with hot deionized water (about 80° C.) and methanol several times to provide the multiblock copolymer comprising the block (X') and the block (Y) and having a weight average molecular weight of 4,000 (g/mol)~400,000 (g/mol).

The reaction for providing the multiblock copolymer comprising the block (X') and the block (Y) is preferably performed in an organic solvent. There is no particular limitation in the organic solvent, as long as the solvent permits reactants and the resultant product to be dissolved well therein. Particular examples of the organic solvent that may be used in the present invention include: N,N-dimethylacetamide (DMAc), N-methyl pyrrolidone (NMP), dimethyl sulfoxide (DMSO), N,N-dimethylformamide (DMF), or the like.

In order to perform sulfonation selectively on the fluorene groups in the multiblock copolymer comprising the block (X') and the block (Y), chlorosulfonic acid ($ClSO_3H$) or tri-methylsilylchlorosulfonate [$(CH_3)_3SiSO_3Cl$] is preferably used as a sulfonating agent. Preferably, the sulfonating agent is used in an amount of 10~200 parts by weight based on the weight of the multiblock copolymer. Additionally, such post-sulfonation is performed preferably at a reaction temperature of 0~60° C. for a reaction time of 0.1~12 hours. More particularly, the multiblock copolymer and chlorosulfonic acid are dissolved separately in an organic solvent, and then the chlorosulfonic acid solution is added to the block copolymer solution to perform post-sulfonation. Then, when sulfonic acid groups are introduced into the polymer, the organic solvent is removed, and the reaction product is washed, filtered and dried to obtain the sulfonated block copolymer comprising the hydrophilic block (X) and the hydrophobic block (Y) according to the present invention.

Also, the sulfonated block copolymer comprising the block (X) and the block (Y) may be prepared by using a precursor in which sulfonic acid groups are introduced into fluorene groups as shown in the above formula 4a for the block copolymerization.

The present invention also provides a resin composition that comprises the sulfonated block copolymer comprising the block (X) and the block (Y).

The resin composition may be a resin composition that comprises only one kind of the sulfonated block copolymer comprising the block (X) and the block (Y), or two or more kinds of the sulfonated block copolymers comprising the block (X) and the block (Y). Additionally, the resin composition according to the present invention may further comprise another resin in addition to the sulfonated block copolymer comprising the block (X) and the block (Y). Non-limiting examples of the resin include: general purpose resins such as polyethylene, polypropylene, polystyrene, polymethylmethacrylate, ABS resin and AS resin; high-performance plastics such as polyacetate, polycarbonate, polyamide, polyethylene terephthalate and polybutylene terephthalate; thermoplastic resins such as polyphenylene sulfide, polyketone, polyimide, polyacrylate and various types of liquid crystal polymers; and thermosetting resins such as epoxy resin, phenolic resin, novolak resin, or the like. Preferably, the sulfonated block copolymer comprising the block (X) and the block (Y) is present in an amount of 50 wt %~100 wt % based on the weight of the resin composition.

Additionally, the resin composition according to the present invention may further comprise various additives including an antioxidant, thermal stabilizer, lubricant, tackifying agent, plasticizer, crosslinking agent, defoaming agent and disepersant, if necessary.

The sulfonated block copolymer comprising the block (X) and the block (Y), or the resin composition, according to the present invention may be processed into molded articles such as fibers or films by way of extrusion and any conventional process such as spinning, rolling or casting.

For example, the sulfonated block copolymer according to the present invention may be formed into a sulfonated multiblock copolymer electrolyte membrane. The electrolyte membrane may be obtained by dissolving the sulfonated block copolymer into a solvent, preferably to a concentration of 5~30% (w/v), and then pouring the solution (preferably, casting the solution onto a glass plate). The solvent may be a conventional organic solvent. More particularly, the solvent may be the same as the organic solvent used in the preparation of the sulfonated block copolymer. Such casting process may be carried out in a manner generally known to one skilled in the art. Preferably, casting is performed until the electrolyte membrane has a thickness of several tens to several hundreds of micrometers, preferably 10~120 μm. Then, the solvent is dried from the sulfonated block copolymer membrane that has undergone casting to provide a film type sulfonated multiblock copolymer electrolyte membrane. The drying step may be performed by increasing the temperature gradually from room temperature to 60~80° C., drying the solvent for 12~24 hours, and further drying the solvent at 90~120° C. for 12~24 hours.

The sulfonated multiblock copolymer electrolyte membrane according to the present invention has excellent mechanical strength and properties, for example a tensile strength of 20~120 Mpa, an elongation of 50~500%, a proton conductivity of 0.01~0.2 S/cm (80° C., relative humidity 80%), and a methanol crossover of 0.1~20 ($10^{-7}$*$cm^2$/sec, room temperature).

Further, the present invention provides a fuel cell using the sulfonated multiblock copolymer electrolyte membrane. The sulfonated multiblock copolymer electrolyte membrane may be used as a proton conductive electrolyte membrane due to its high proton conductivity, excellent mechanical properties and excellent chemical stability. More particularly, the ion conductive electrolyte membrane may be used as an ion exchange membrane in a polymer electrolyte fuel cell or a direct methanol fuel cell.

MODE FOR CARRYING OUT THE INVENTION

Reference will now be made in detail to the preferred embodiments of the present invention. It is to be understood that the following examples are illustrative only and the present invention is not limited thereto.

COMPARATIVE EXAMPLE 1

Preparation of Copolymer Corresponding to Block (X)

(Preparation of Copolymer)

A dean-stark trap was connected to a 250 mL round bottom flask. Next, 5 g (19.67 mmol) of bis(4-fluorophenyl)sulfone, 6.89 g (19.67 mmol) of 9,9-bis(4-hydroxyphenyl)fluorene and 5.44 g (39.34 mmol) of potassium carbonate were added to a mixed solvent containing 100 mL of N-methyl-2-pyrrolidone and 80 mL of benzene.

Then, the reaction mixture was agitated under the nitrogen atmosphere at 140° C. for 4 hours, the azeotropic mixture of benzene with water was removed from the dean-stark trap, and the reaction temperature was increased to 180° C. to perform polymerization for 12 hours.

After the completion of the reaction, the resultant copolymer was poured into 1 L of methanol so as to be precipitated therein, and the precipitate was filtered to obtain a cake. Then, the cake was dried in a vacuum oven at a temperature of 80° C. or higher for 12 hours or more to provide 10.6 g of a copolymer represented by the following formula 6;

[Formula 6]

(Post-Sulfonation)

The copolymer obtained as described above was sulfonated with chlorosulfonic acid ($ClSO_3H$) to partly introduce sulfonic acid groups into the copolymer.

First, 1 g of the copolymer obtained as described above was introduced into a 500 mL round bottom flask. Next, a solution containing 0.45 g of chlorosulfonic acid dissolved in 100 g of dichloromethane (DCM) at room temperature was diluted with 50 mL of dichloromethane, and the diluted solution was introduced into the round bottom flask in a small portion through a dropping funnel to allow reaction of the mixture. The reaction was performed at room temperature. Then, dichloromethane solvent was removed when sulfonic acid groups were introduced into the copolymer so that brown precipitate was formed on the wall of the flask. Next, the precipitate was washed repeatedly with distilled water until it was neutralized. After the precipitate was filtered off, it was dried at a vacuum oven at 80° C. for 12 hours to obtain a sulfonated copolymer.

COMPARATIVE EXAMPLE 2

Preparation of Copolymer Corresponding to Block (X)

Comparative Example 1 was repeated to provide 12.3 g of a white copolymer represented by the following formula 7, except that 5 g (22.94 mmol) of 4,4'-difluorobenzophenone, 8.04 g (22.94 mmol) of 9,9-bis(4-hydroxyphenyl)fluorene and 6.34 g (45.87 mmol) of potassium carbonate were used. Then, a sulfonated copolymer was obtained from the above copolymer represented by formula 7 according to the same post-sulfonation process as described in Comparative Example 1:

[Formula 7]

COMPARATIVE EXAMPLE 3

Preparation of Copolymer Corresponding to Block (Y)

Comparative Example 1 was repeated to provide 10.4 g of a copolymer represented by the following formula 8, except that 5 g (19.67 mmol) of bis(4-fluorophenyl)sulfone, 5.44 g (19.67 mmol) of 2,2-bis(4-hydroxyphenyl)hexafluoropropane and 5.44 g (39.34 mmol) of potassium carbonate were used. Then, a sulfonated copolymer was obtained from the above copolymer represented by formula 8 according to the same post-sulfonation process as described in Comparative Example 1:

[Formula 8]

COMPARATIVE EXAMPLE 4

Preparation of Random Copolymer

Comparative Example 1 was repeated to provide 9.1 g of a copolymer represented by the following formula 9, except that 4.54 g (17.85 mmol) of bis(4-fluorophenyl)sulfone, 2 g (5.95 mmol) of 2,2-bis(4-hydroxyphenyl)hexafluoropropane, 4.17 g (11.9 mmol) of 9,9-bis(4-hydroxyphenyl)fluorene, and 4.93 g (35.69 mmol) of potassium carbonate were used. Then, a sulfonated copolymer was obtained from the above copolymer represented by formula 9 according to the same post-sulfonation process as described in Comparative Example 1:

[Formula 9]

EXAMPLE 1

Preparation of Multiblock Copolymer Comprising Block (X) and Block (Y)

(Preparation of Oligomer)

Comparative Example 1 was repeated to provide 23.1 g of an oligomer represented by the following formula 10 and having a weight average molecular weight of about 5,000 (g/mol), except that 14 g (64.16 mmol) of 4,4'-difluorobenzophenone, 6.34 g (18.86 mmol) of 2,2-bis(4-hydroxyphenyl)hexafluoropropane, 7.03 g (37.73 mmol) of 4,4'-biphenol, and 15.64 g (113.18 mmol) of potassium carbonate were used:

[Formula 10]

wherein m/n is 2.

(Preparation of Multiblock Copolymer)

Comparative Example 1 was repeated to provide 9.2 g of a multiblock copolymer represented by the following formula 11, except that 5 g (1.00 mmol) of the oligomer obtained as described above, 1.96 g (9 mmol) of 4,4'-difluorobenzophenone, 3.5 g (10.00 mmol) of 9,9-bis(4-hydroxyphenyl)fluorene, and 2.76 g (20.00 mmol) of potassium carbonate were used:

(Preparation of Multiblock Copolymer)

Comparative Example 1 was repeated to provide 8.0 g of a copolymer represented by the following formula 13, except that 5 g (1.00 mmol) of the oligomer obtained as described above, 1.5 g (5.9 mmol) of bis(4-fluorophenyl)sulfone, 2.42 g (7.20 mmol) of 2,2-bis(4-hydroxyphenyl)hexafluoropropane, and 1.99 g (14.40 mmol) of potassium carbonate were used:

[Formula 11]

(Post-Sulfonation)

A sulfonated copolymer was obtained from the above copolymer represented by formula 11 according to the same post-sulfonation process as described in Comparative Example 1.

EXAMPLE 2

Preparation of Multiblock Copolymer Comprising Block (X) and Block (Y)

(Preparation of Oligomer)

Comparative Example 1 was repeated to provide 30.8 g of an oligomer represented by the following formula 12 and having a weight average molecular weight of about 5,000 (g/mol), except that 15 g (98.35 mmol) of bis(4-fluorophenyl) sulfone, 22.46 g (64.09 mmol) of 9,9'-bis(4-hydroxyphenyl) fluorene, and 17.71 g (128.00 mmol) of potassium carbonate were used:

[Formula 12]

[Formula 13]

(Post-Sulfonation)

A sulfonated multiblock copolymer was obtained from the above copolymer represented by formula 13 according to the same post-sulfonation process as described in Comparative Example 1.

EXAMPLE 3

Preparation of Multiblock Copolymer Comprising Block (X) and Block (Y)

(Preparation of Oligomer)

Comparative Example 1 was repeated to provide 33.9 g of an oligomer represented by the following formula 14 and having a weight average molecular weight of about 5,000 (g/mol), except that 16.51 g (75.66 mmol) of 4,4'-difluorobenzophenone, 22.46 g (64.09 mmol) of 9,9-bis(4-hydroxyphenyl)fluorene, and 17.71 g (128.00 mmol) of potassium carbonate were used:

(Post-Sulfonation)

A sulfonated block copolymer was obtained from the above copolymer represented by formula 15 according to the same post-sulfonation process as described in Comparative Example 1.

Figure 2:
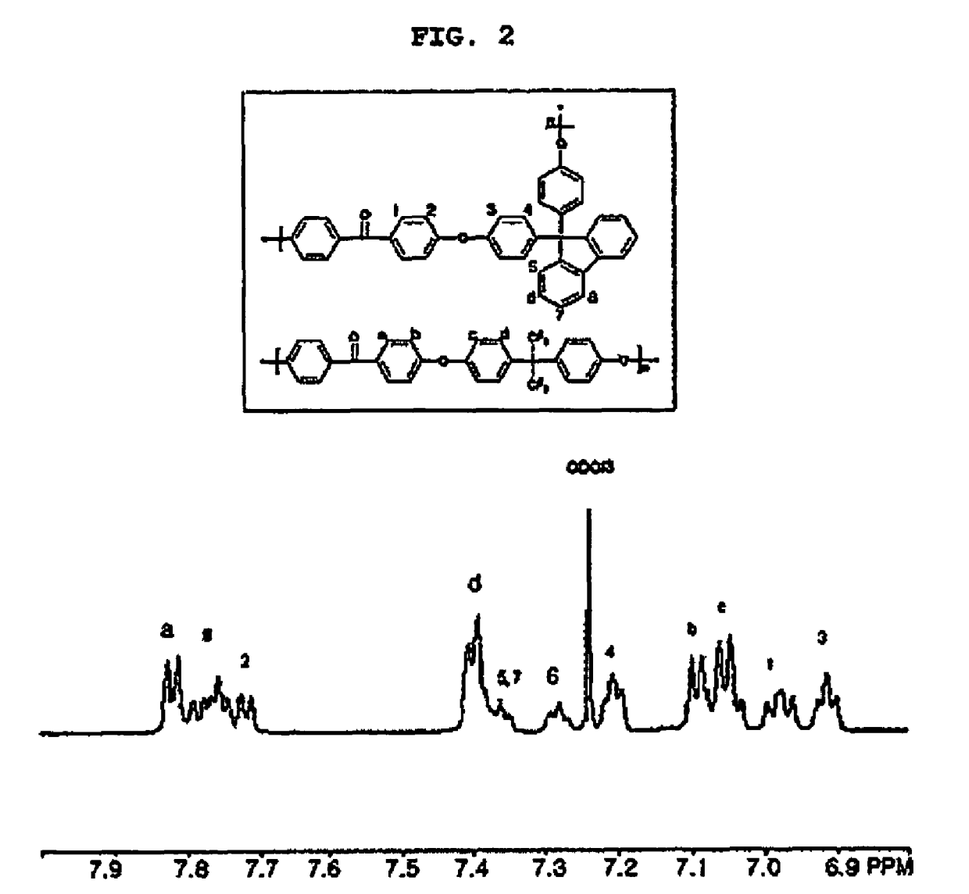
FIG. 2 is a chart showing the $^1$H-NMR spectrum of the copolymer according to a preferred embodiment of the present invention, before post-sulfonation.
Figure 3:
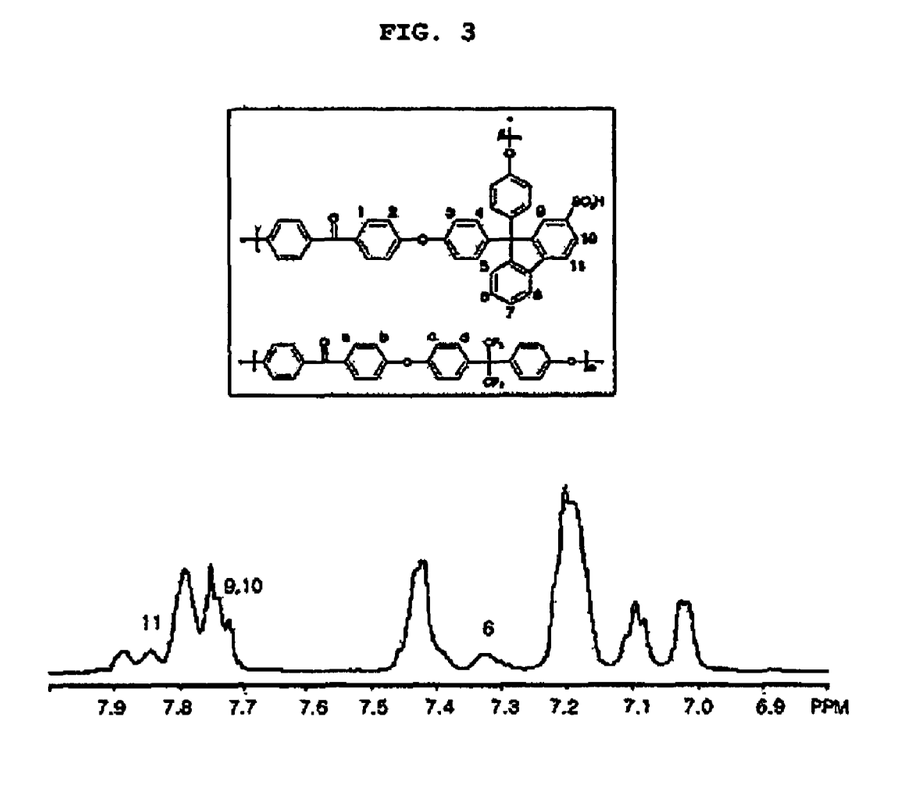
FIG. 3 is a chart showing the $^1$H-NMR spectrum of the copolymer according to a preferred embodiment of the present invention, after post-sulfonation.

The sulfonated block copolymer according to Example 3 was analyzed for its structure by $^1$H NMR spectrometry before and after the post-sulfonation. The results are shown in FIGS. 2 and 3. As shown in FIGS. 2 and 3, sulfonic acid groups were introduced selectively into fluorene compounds.

<Manufacture of Electrolyte Membrane>

Electrolyte membranes 1~7 were manufactured from the sulfonated copolymers according to Comparative Examples 1~4 and Examples 1~3. Each sulfonated copolymer was dissolved completely into dimethyl sulfoxide, and was subjected to casing onto a glass substrate via a pouring process to obtain a membrane having a predetermined thickness. Then, the membrane was dried in a vacuum oven at 80° C. for 12 hours

[Formula 14]

(Preparation of Multiblock Copolymer)

Comparative Example 1 was repeated to provide 8.0 g of a copolymer represented by the following formula 15, except that 5 g (1.00 mmol) of the oligomer obtained as described above, 1.35 g (6.19 mmol) of 4,4'-difluorobenzophenone, 2.42 g (7.20 mmol) of 2,2-bis(4-hydroxyphenyl)hexafluoropropane, and 1.99 g (14.40 mmol) of potassium carbonate were used:

to remove the solvent. By doing so, a sulfonated copolymer electrolyte membrane with a thickness of 20~200 μm was obtained.

Each electrolyte membrane obtained as described above was measured for its ion exchange capacity (IEC), proton conductivity, methanol crossover and water/ethanol absorptivity, according to the following test methods.

[Formula 15]

(a) Ion Exchange Capacity (IEC)

About 0.5 g of each electrolyte membrane was hydrated in ultrapure water at 100° C. for 2 hours, and then dipped into 100 mL of NaCl solution for at least 10 hours in order to substitute protons ($H^+$) with sodium ions ($Na^+$). Titration of the protons substituted as described above was carried out by using 0.1N NaOH standard solution. Then, IEC value of each polymer membrane was calculated from the amount of NaOH used for titration according to the following mathematical formula 1. The results are shown in the following Table 1. Herein, IEC value of the Nafion 115 available from Dupont Co. was used as a reference value.

$IEC$(—$SO_3H$ meq/g)=(amount (mL) of NaOH standard solution used for titration×0.1 N)/weight (g) of each dried membrane      [Mathematical Formula 1]

TABLE 1

| | IEC | Physical Properties |
|---|---|---|
| Electrolyte Membrane 1 (Comp. Ex. 1) | 1.50 | The electrolyte membrane was dissolved gradually into boiling water or methanol. |
| Electrolyte Membrane 2 (Comp. Ex. 2) | 1.60 | The electrolyte membrane was dissolved gradually into boiling water or methanol, |
| Electrolyte Membrane 3 (Comp. Ex. 3) | / | No post-sulfonation |
| Electrolyte Membrane 4 (Comp. Ex. 4) | 1.35 | The electrolyte membrane was transparent without phase separation, but was broken upon drying |
| Electrolyte Membrane 5 (Example. 1) | 1.20 | The electrolyte membrane was transparent and showed excellent physical properties. |
| Electrolyte Membrane 6 (Example. 2) | 1.40 | The electrolyte membrane was transparent and showed excellent physical properties. |
| Electrolyte Membrane 7 (Example. 3) | 1.45 | The electrolyte membrane was transparent and showed excellent physical properties. |
| Nafion 115 | 0.91 | The electrolyte membrane was transparent and showed excellent physical properties. |

As shown in Table 1, Electrolytes membranes 5, 6 and 7 according to the present invention had improved IEC values compared to Nafion conventionally used as a polymer electrolyte membrane, was transparent, and showed excellent physical properties (see Table 2, mechanical strength).

(b) Proton Conductivity

Each of electrolyte membranes 5, 6 and 7 and Nafion was measured for the proton conductivity by the potentio-static two-probe method.

First, carbon paper electrodes with a size of 1.5×1.5 $cm^2$ were attached to both sides of a sample with a size of 1.5×1.5 $cm^2$. Next, an AC voltage of 5 mV was applied to both ends of the electrode at a frequency of 1 MHz to 100 MHz, while ultrapure water was allowed to flow outside of the above structure. Herein, the AC current applied to both ends of the electrode provided an impedance, which was used to obtain the proton conductivity of each sulfonated electrolyte membrane.

Figure 4:
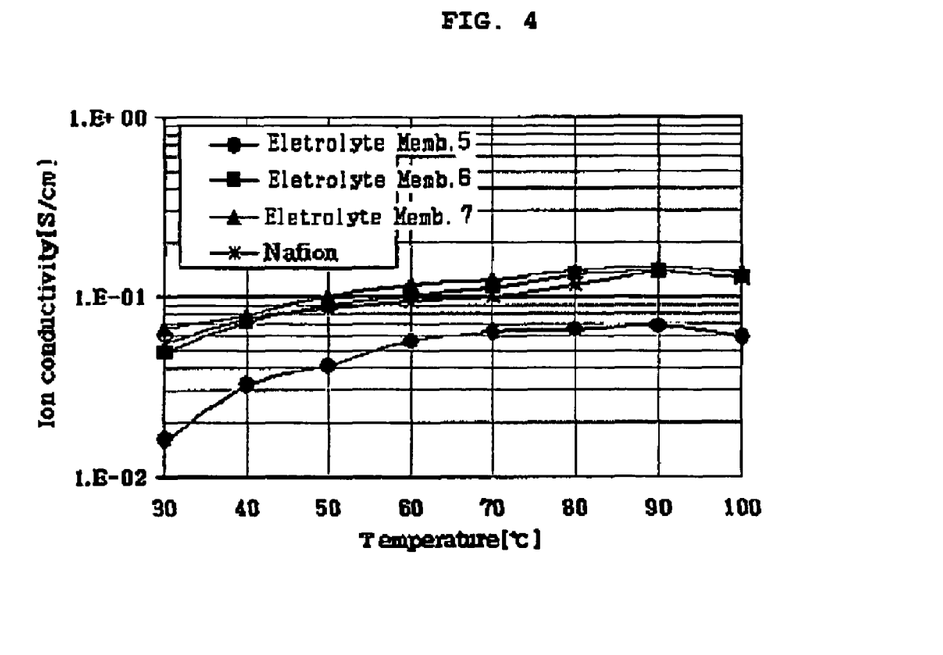
FIG. 4 is a graph showing the proton conductivity of the electrolyte membranes using the sulfonated multiblock copolymers according to the present invention, and that of the Nafion electrolyte membrane.

FIG. 4 shows the results for the proton conductivity measured for each of electrolyte membranes 5, 6, and 7 and Nafion 115. As can be seen from FIG. 4, the sulfonated multiblock copolymer electrolyte membranes 5, 6 and 7 according to the present invention show improved proton conductivity compared to the Nafion conventionally used as a polymer electrolyte membrane.

Electrolyte membranes 1, 2 and 4 according to Comparative Examples showed poor physical properties, and thus were not available for the measurement of proton conductivity. Additionally, electrolyte membrane 3 was not available for post-sulfonation.

(c) Methanol Crossover (MeOH Crossover)

The above electrolyte membranes 5, 6 and 7 and Nafion 115 were measured for methanol crossover by using a diffusion cell.

First, 10M aqueous methanol was introduced into the left cell, and pure water was introduced into the right cell. Next, each electrolyte membrane was inserted between both cells, and solution samples were collected from the right cell to determine variations ($C_i(t)$) in the methanol concentration in the right cell with time (t). Then, methanol crossover was calculated. The above test was performed at room temperature, and methanol crossover ($D_i·K_i$) was calculated from the thickness (L) of the electrolyte, exposed area (A) of the membrane, volume (V) of the right cell, and initial methanol concentration ($C_{io}$) in the left cell, according to the following mathematical formula 2;

$C_i(t) = \{(A·D_i·K_i·C_{io})/V·L\} \times t$      [Formula 2]

The following Table 2 shows the results for the methanol crossover of each of electrolyte membranes 5, 6 and 7 and Nafion 115 (Dupont).

TABLE 2

| | Stress (Mpa) | Strain (%) | Methanol Crossover ($10^{-7}$ * $cm^2$/sec) |
|---|---|---|---|
| Electrolyte Membrane 1 (Comp. Ex. 1) | 92.4 | 15 | / |
| Electrolyte Membrane 2 (Comp. Ex. 2) | 58.8 | 120 | / |
| Electrolyte Membrane 3 (Comp. Ex. 3) | / | / | / |
| Electrolyte Membrane 4 (Comp. Ex. 4) | 88.6 | 10 | / |
| Electrolyte Membrane 5 (Example. 1) | 70.6 | 180 | 3.9 |
| Electrolyte Membrane 6 (Example. 2) | 98.5 | 30 | 5.5 |
| Electrolyte Membrane 7 (Example. 3) | 65.5 | 250 | 6.1 |
| Nafion 115 | 15.7 | 280 | 24 |

As can be seen from Table 2, sulfonated multiblock copolymer electrolyte membranes 5, 6 and 7 according to the present invention shows significantly improved methanol barrier properties compared to the Nafion conventionally used as a polymer electrolyte membrane. Electrolytes 1, 2 and 4 were not available for the measurement of methanol crossover due to their poor physical properties.

(d) Water/Methanol Absorptivity

Each of the above electrolyte membranes was dipped into ultrapure water or methanol at room temperature, 40° C., 60° C., 80° C. and 100° C. Next, water or methanol present on the surface of each membrane was removed to measure the weight of the membrane. Then, each membrane was dried in a vacuum oven at 100° C. for at least 12 hours, and the weight of the dried membrane was measured. Water/methanol absorptivity was calculated according to the following mathematical formula 3:

Absorptivity (%)={(weight of the membrane after absorption−weight of the dried membrane)/(weight of the dried membrane)}× 100     [Mathematical Formula 3]

The following Table 3 shows the results for the water/methanol absorptivity of each of the above electrolyte membranes and Nafion 115 (Dupont).

TABLE 3

|  | Water/(° C.) | | | | | Methanol/(° C.) | | |
| --- | --- | --- | --- | --- | --- | --- | --- | --- |
|  | RT | 40 | 60 | 80 | 100 | RT | 40 | 60 |
| Electrolyte Membrane 1 (Comp. Ex. 1) | 40 | 80 | 200 | / | / | / | / | / |
| Electrolyte Membrane 2 (Comp. Ex. 2) | 60 | 120 | / | / | / | / | / | / |
| Electrolyte Membrane 3 (Comp. Ex. 3) | / | / | / | / | / | / | / | / |
| Electrolyte Membrane 4 (Comp. Ex. 4) | 35 | 60 | 160 | / | / | / | / | / |
| Electrolyte Membrane 5 (Example 1) | 18 | 25 | 32 | 50 | 60 | 25 | 38 | 45 |
| Electrolyte Membrane 6 (Example 2) | 20 | 28 | 38 | 55 | 70 | 30 | 42 | 56 |
| Electrolyte Membrane 7 (Example 3) | 25 | 32 | 40 | 65 | 83 | 37 | 48 | 60 |
| Nafion 115 | 15 | 18 | 20 | 30 | 35 | 52 | 85 | 130 |

As can be seen from Table 3, sulfonated multiblock copolymer electrolyte membranes 5, 6 and 7 according to the present invention show somewhat increased water absorptivity and decreased methanol absorptivity compared to the Nafion conventionally used as a polymer electrolyte membrane.

INDUSTRIAL APPLICABILITY

As can be seen from the foregoing, the present invention provides a sulfonated multiblock copolymer, which comprises a sulfonic acid group-containing hydrophilic block (X) and a sulfonic acid group-free hydrophobic block (Y), linked to each other alternately, wherein each of the hydrophilic block (X) and hydrophobic block (Y) has a controlled molecular weight and proportion. Because the distribution, position and number of sulfonic acid groups are controlled in the sulfonated multiblock copolymer according to the present invention, the electrolyte membrane comprising the multiblock copolymer shows no degradation in physical properties, caused by an increased number of sulfonic acid groups, has high proton conductivity as well as excellent mechanical properties, and is chemically stable. Additionally, chemical bonds in the polymer backbone of the sulfonated multiblock copolymer according to the present invention are not adversely affected during post-sulfonation, so that the copolymer can be processed into a thin film with ease.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A sulfonated multiblock copolymer, which comprises a hydrophilic block (X) having a repeating unit represented by the following formula 1a, and a hydrophobic block (Y) having a repeating unit represented by the following formula 2, wherein number (m) of the repeating unit of formula 1a in the hydrophilic block (X) and number (n) of the repeating unit of formula 2 in the hydrophobic block (Y) satisfy the conditions of $4 \leq m \leq 400$ and $4 \leq n \leq 400$:

[Formula 1a]

[Formula 2]

wherein $Ar^1$ is a bonding unit represented by the following formula 3; $Ar^{2a}$ is a bonding unit represented by the following formula 4a; and $Ar^3$ is a bonding unit represented by the following formula 5;

[Formula 3]

wherein A is a direct bond, —O—, —S—, —CO—, —$SO_2$—, —$C(CH_3)_2$—, or —$C(CF_3)_2$—; and each of $R^1$ to $R^8$ independently represents a hydrogen atom, C1~C6 alkyl group, C2~C6 alkenyl group, C2~C6 alkynyl group, nitro group, chlorine, bromine, oxo or a hydroxy group;

[Formula 4a]

wherein each of x and x' independently represents a number satisfying the conditions of $0 \leq x \leq 1$ and $0 \leq x' \leq 1$, with the proviso that $0 < x+x' \leq 2$; and each of $R^9$ to $R^{22}$ independently represents a hydrogen atom, C1~C6 alkyl group, C2~C6 alkenyl group, C2~C6 alkynyl group, nitro group, chlorine, bromine, oxo or a hydroxy group; and

[Formula 5]

wherein B is a direct bond, —O—, —S—, —CO—, —$SO_2$—, —$C(CH_3)_2$—, or —$C(CF_3)_2$—; and each of $R^{23}$ to $R^{30}$ independently represents a hydrogen atom, C1~C6 alkyl group, C2~C6 alkenyl group, C2~C6 alkynyl group, nitro group, chlorine, bromine, oxo or a hydroxy group.

2. The sulfonated multiblock copolymer according to claim 1, which forms a two-dimensional pattern, wherein the hydrophobic block (Y) having a repeating unit represented by formula 2 forms a film base, and the hydrophilic block (X) having a repeating unit represented by formula 1a protrudes out of the film base in the form of cylinders.

3. The sulfonated multiblock copolymer according to claim 1, wherein the hydrophobic block (Y) has a molecular weight of 2,000 (g/mol)~200,000 (g/mol).

4. The sulfonated multiblock copolymer according to claim 1, wherein the hydrophobic block (Y) has a mechanical strength corresponding to an elongation of 50% or more and a tensile strength of 20 Mpa or more.

5. The sulfonated multiblock copolymer according to claim 1, wherein the hydrophilic block (X) has a molecular weight corresponding to 0.2~4 times of molecular weight of the hydrophobic block (Y) in the multiblock copolymer.

6. The sulfonated multiblock copolymer according to claim 1, which has a molecular weight of 4,000 (g/mol)~400,000 (g/mol).

7. The sulfonated multiblock copolymer according to claim 1, which comprises at least one kind of hydrophilic block (X) and at least one kind of hydrophobic block (Y).

8. The sulfonated multiblock copolymer according to claim 1, wherein at least one of $Ar^1$, $Ar^{2a}$ and $Ar^3$ is provided in such a manner that $Ar^1$, $Ar^{2a}$ or $Ar^3$ having at least two different structures is present at the same block or different blocks in the same sulfonated block copolymer.

9. The sulfonated multiblock copolymer according to claim 1, which further comprises an additional unit other than the repeating units that form the hydrophilic block (X) and hydrophobic block (Y).

10. The sulfonated multiblock copolymer according to claim 1, wherein precursor of $Ar^1$ is at least one compound selected from the group consisting of 4,4'-difluorobenzophenone, 4,4'-dichlorodiphenylsulfone, 4,4'-difluorodiphenylsulfone, and bis(4-fluorophenyl)sulfone.

11. The sulfonated multiblock copolymer according to claim 1, wherein precursor of $Ar^{2a}$ is 9,9-bis(4-hydroxyphenylfluorene).

12. The sulfonated multiblock copolymer according to claim 1, wherein precursor of $Ar^3$ is at least one compound selected from the group consisting of 2,2-bis(4-hydroxyphenyl)hexafluoropropane, 4,4'-biphenol, bis(4-hydroxyphenyl) sulfone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)methane, 2,2-bis(4-hydroxy-3,5-dimethylphenyl)propane, bis(4-hydroxy-3,5-dimethylphenyl)methane, and bis(4-hydroxy-2,5-dimethylphenyl)methane, 13. A method for preparing the sulfonated multiblock copolymer as defined in claim 1, which comprises the steps of:
(a) providing a block copolymer comprising a block (X') having a repeating unit represented by the following formula 1b and a block (Y) having a repeating unit represented by the following formula 2; and
(b) subjecting the block copolymer obtained from step (a) to sulfonation:

[Formula 1b]

[Formula 2]

wherein $Ar^1$ is a bonding unit represented by the following formula 3; $Ar^{2b}$ is a bonding unit represented by the following formula 4b; and $Ar^3$ is a bonding unit represented by the following formula 5;

[Formula 3]

wherein A is a direct bond, —O—, —S—, —CO—, —SO$_2$—, —C(CH$_3$)$_2$—, or —C(CF$_3$)$_2$—; and each of $R^1$ to $R^8$ independently represents a hydrogen atom, C1~C6 alkyl group, C2~C6 alkenyl group, C2~C6 alkynyl group, nitro group, chlorine, bromine, oxo or a hydroxy group;

[Formula 4b]

wherein each of $R^9$ to $R^{22}$ independently represents a hydrogen atom, C1~C6 alkyl group, C2~C6 alkenyl group, C2~C6 alkynyl group, nitro group, chlorine, bromine, oxo or a hydroxy group; and

[Formula 5]

wherein B is a direct bond, —O—, —S—, —CO—, —SO$_2$—, —C(CH$_3$)$_2$—, or —C(CF$_3$)$_2$—; and each of $R^{23}$ to $R^{30}$ independently represents a hydrogen atom, C1~C6 alkyl group, C2~C6 alkenyl group, C2~C6 alkynyl group, nitro group, chlorine, bromine, oxo or a hydroxy group.

14. The method according to claim 13, wherein the block copolymer comprising the block (X') and the block (Y) is provided by any one process selected from a first process including the following steps (i) and (ii), and a second process including the following steps (i') and (ii'):
(i) copolymerizing at least one precursor selected from the group consisting of precursors for providing the bonding unit represented by formula 3 with at least one precursor selected from the group consisting of precursors for providing the bonding unit represented by formula 4b to provide at least one precursor for providing the block (X') having the repeating unit represented by formula 1b;

(ii) copolymerizing at least one precursor for providing the block (X') with at least one precursor selected from the group consisting of precursors for providing the bonding unit represented by formula 3 and at least one precursor selected from the group consisting of precursors for providing the bonding unit represented by formula 5;

(i') copolymerizing at least one precursor selected from the group consisting of precursors for providing the bonding unit represented by formula 3 with at least one precursor selected from the group consisting of precursors for providing the bonding unit represented by formula 5 to provide at least one precursor for providing the block (Y) having the repeating unit represented by formula 2; and (ii') copolymerizing at least one precursor for providing the block (Y) with at least one precursor selected from the group consisting of precursors for providing the bonding unit represented by formula 3 and at least one precursor selected from the group consisting of precursors for providing the bonding unit represented by formula 4b.

15. The method according to claim 13, wherein the sulfonation in step (b) is performed by using chlorosulfonic acid (ClSO$_3$H) or trimethylsilylchloro sulfonate [(CH$_3$)$_3$SiSO$_3$Cl] as a sulfonating agent.

16. A molded article obtained from a resin composition comprising the sulfonated multiblock copolymer as defined in claim 1.

17. The molded article according to claim 16, which is an electrolyte membrane.

18. A fuel cell, which comprises an electrolyte membrane formed from a resin composition comprising the sulfonated multiblock copolymer as defined in claim 1.

19. The fuel cell according to claim 18, which is a polymer electrolyte fuel cell or a direct methanol fuel cell.

* * * * *